United States Patent
Hosaka et al.

(10) Patent No.: US 10,246,530 B2
(45) Date of Patent: Apr. 2, 2019

(54) METHOD FOR PRODUCING SOLID CATALYST COMPONENT FOR OLEFIN POLYMERIZATION, CATALYST FOR OLEFIN POLYMERIZATION AND A PROCESS FOR PROPYLENE POLYMERIZATION

(71) Applicant: TOHO TITANIUM CO., LTD., Chigasaki-shi, Kanagawa (JP)

(72) Inventors: Motoki Hosaka, Chigasaki (JP); Toshihiko Sugano, Chigasaki (JP); Tsutomu Uzawa, Chigasaki (JP)

(73) Assignee: TOHO TITANIUM CO., LTD., Chigasaki-shi (JP)

( * ) Notice: Subject to any disclaimer, the term of this patent is extended or adjusted under 35 U.S.C. 154(b) by 0 days.

(21) Appl. No.: 15/634,410

(22) Filed: Jun. 27, 2017

(65) Prior Publication Data
US 2018/0371120 A1    Dec. 27, 2018

(51) Int. Cl.
*C08F 10/06*    (2006.01)
*C08F 10/02*    (2006.01)

(52) U.S. Cl.
CPC .............. *C08F 10/06* (2013.01); *C08F 10/02* (2013.01)

(58) Field of Classification Search
None
See application file for complete search history.

(56) References Cited

U.S. PATENT DOCUMENTS

| | | | |
|---|---|---|---|
| 4,663,299 A | 5/1987 | Chadwick et al. |
| 4,728,704 A | 3/1988 | Chadwick et al. |
| 6,818,583 B1 | 11/2004 | Morini et al. |
| 7,208,435 B2 | 4/2007 | Hosaka et al. |
| 9,206,265 B2 | 12/2015 | Uozumi et al. |

| | | | |
|---|---|---|---|
| 2015/0166693 A1 | 6/2015 | Hosaka et al. |
| 2015/0240002 A1 | 8/2015 | Hosaka et al. |
| 2015/0240011 A1 | 8/2015 | Hosaka et al. |

FOREIGN PATENT DOCUMENTS

| | | | |
|---|---|---|---|
| JP | 58-41832 | | 3/1983 |
| JP | 62-51633 A | | 3/1987 |
| JP | 3-74341 A | | 3/1991 |
| JP | 4-368391 A | | 12/1992 |
| JP | 8-73388 A | | 3/1996 |
| JP | 2014-162905 A | | 9/2014 |
| JP | 2014-162906 A | | 9/2014 |
| WO | WO-2014132805 A1 * | 9/2014 | .............. C08F 10/00 |

OTHER PUBLICATIONS

International Search Report dated Sep. 4, 2018, issued in counterpart International Application No. PCT/JP2018/021905. (11 pages).

* cited by examiner

*Primary Examiner* — Catherine S Branch
(74) *Attorney, Agent, or Firm* — Westerman, Hattori, Daniels & Adrian, LLP

(57) ABSTRACT

A method for producing a solid catalyst for olefin (co) polymerization includes bringing into contact with each other a magnesium compound, a tetravalent titanium halide compound, an organic compound represented the following general formula (1)

$$R^1{}_k(C_6H_{4-k})(COOR^2)(COOR^3) \quad (1)$$

and an organic compound represented the following general formula (2)

$$R^4R^5C\!\!=\!\!C\,(COOR^6)(COOR^7) \quad (2)$$

wherein $R^1$ is a halogen atom or an alkyl group, $R^2$ and $R^3$ are a linear alkyl group, $R^4$ and $R^5$ are independently an atom or group selected from a hydrogen atom, halogen, a linear alkyl group, a branched alkyl group a vinyl group, a linear or branched alkenyl group, a cycloalkenyl group, an aromatic hydrocarbon group, and $R^6$ and $R^7$ are independently a linear alkyl group, a branched alkyl group, a vinyl group, a linear or branched alkenyl group a cycloalkyl group, a cycloalkenyl group, or an aromatic hydrocarbon group.

5 Claims, No Drawings

METHOD FOR PRODUCING SOLID CATALYST COMPONENT FOR OLEFIN POLYMERIZATION, CATALYST FOR OLEFIN POLYMERIZATION AND A PROCESS FOR PROPYLENE POLYMERIZATION

TECHNICAL FIELD

The present invention relates to a method for producing a solid catalyst component for olefin polymerization, an olefin polymerization catalyst, and a process for propylene polymerization for producing a highly isotactic olefin polymer with broad molecular weight distribution that exhibits high stiffness.

BACKGROUND ART

A solid catalyst component that includes magnesium, titanium, internal electron donor, and a halogen as essential components has been used when polymerizing an olefin (e.g., propylene). A number of methods that polymerize an olefin or copolymerize olefins in the presence of an olefin polymerization catalyst that includes the solid catalyst component, an organoaluminum compound, and an organosilicon compound, have been proposed.

Polypropylene compositions are mainly controlled by the kind of solid catalyst and polymerization conditions. From a point view of polypropylene stiffness (i.e. flexural modulus, for example), it is strongly correlated to the isotacticity of polypropylene; generally, highly isotactic polypropylene shows high flexural modulus. This type of polypropylene is utilized for automotive, for example.

For example, Patent Document 1 and 2 disclose olefin polymerization catalysts with high isospecificity. Polypropylene produced with these catalysts above shows high flexural modulus. However, there is still scope for improvement in flexural modulus of polypropylene.

On the other hand, some substituted malonate compounds are found to be an excellent internal donor to give polypropylene with high isotacticity. For example, Patent Document 3 discloses olefin polymerization catalyst including alkylidene malonate compound as an internal electron donor. And Patent 4 discloses olefin polymerization catalyst including dialkyl-substituted malonate compound as an internal electron donor. With these catalysts, polypropylene containing low xylene-soluble fraction (atactic polypropylene) can be obtained. However, these types of polypropylene cannot be applied to automotive use due to insufficient isotacticity.

Furthermore, Patent Document 5 discloses olefin polymerization catalysts containing succinate compound as an internal electron donor. When using the catalyst system above, the resulting polypropylene has a broad molecular weight distribution, and inferior isotacticity as compared with a polypropylene produced using a solid catalyst that utilizes a phthalate compound as an internal electron donor. Therefore, it is difficult to obtain a polypropylene that exhibits high flexural modulus.

RELATED ART DOCUMENT

Patent Document

Patent Document 1: US2015166693A1
Patent Document 2: US2015240011A1
Patent Document 3: US9206265B2
Patent Document 4: US7208435B2
Patent Document 5: US6818583B1

Technical Problem

An object of the invention is to provide a method to prepare a solid catalyst component for olefin polymerization that is suitable for producing an olefin polymer with high isotacticity and broad molecular weight distribution. This sort of polyolefin shows high flexural modulus due to high isotacticity and an orientation of high molecular weight fraction in the process of injection molding.

Solution to Problem

The inventors of the invention conducted extensive studies in view of the above situation. As a result, the inventors found that the object above can be achieved by conducting olefin (co)polymerization using a catalyst that is obtained by bringing magnesium compound, titanium halide compound, phthalate and alkylidene malonate compound into contact with each other. This finding has led to the completion of the invention.

Specifically, one aspect of the invention provides a method for producing a solid catalyst for olefin (co)polymerization includes bringing a magnesium compound, tetravalent titanium halide compound, an organic compound represented the following general formula (1)

  (1) and an organic compound represented the following general formula (2)

  (2)

wherein $R^1$ is a halogen atom or an alkyl group having 1 to 8 carbon atoms, $R^2$ and $R^3$ are a linear alkyl group having 1 to 6 carbon atoms, provided that $R^2$ and $R^3$ are either identical or different, and k is an integer from 0 to 4, provided that a plurality of $R^1$ are either identical or different when k is an integer from 2 to 4, and wherein $R^4$ and $R^5$ are independently an atom or group selected from a hydrogen atom, halogen, a linear alkyl group having 1 to 20 carbon atoms, a branched alkyl group having 3 to 20 carbon atoms, a vinyl group, a linear or branched alkenyl group having 3 to 20 atoms, a cycloalkenyl group having 3 to 20 carbon atoms, an aromatic hydrocarbon group having 6 to 20 carbon atoms, provided that $R^4$ and $R^5$ optionally bond to each other to form a ring, and the number of carbon atoms of $R^5$ is 2 or more when $R^4$ is a hydrogen atom or a methyl group; and wherein $R^6$ and $R^7$ are independently a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 20 atoms.

According to another aspect of the invention, an olefin polymerization catalyst includes (I) a solid catalyst component for olefin polymerization obtained by the method according to one aspect of the invention, (II) an organo aluminum compound represented by the following general formula (3),

  (3) and (III) an external donor compound represented by the following general formula (4) and an external donor compound represented by the following general formula (5)

  (4)

  (5)

wherein $R^8$ is an alkyl group having 1 to 6 carbon atoms; Q is a hydrogen atom or halogen atom; and p is an integer from 0 to 3; and wherein $R^9$ is an alkyl group having 1 to 12 carbon atoms, a cycloalkyl group having 3 to 12 carbon atoms, a phenyl group, a vinyl group, an allyl group, or an aralkyl group, provided that a plurality of $R^9$ are either identical or different when a plurality of $R^9$ are present;

$R^{10}$ is an alkyl group having 1 to 4 carbon atoms, a cycloalkyl group having 3 to 6 carbon atoms, a phenyl group, a vinyl group, an allyl group, or an aralkyl group, provided that a plurality of $R^{10}$ are either identical or different when a plurality of $R^{10}$ are present; and q is an integer from 0 to 3;

$R^{11}$ and $R^{12}$ are a hydrogen atom, a linear alkyl group having 1 to 20 carbon atoms, a branched alkyl group having 3 to 20 carbon atoms, a vinyl group, an allyl group, or an aralkyl group, a cycloalkyl group having 3 to 20 carbon atoms, or aryl group, provided that $R^{11}$ and $R^{12}$ are either identical or different, and optionally bond to each other to form a ring;

$R^{13}$ is a a linear alkyl group having 1 to 20 carbon atoms, a branched alkyl group having 3 to 20 carbon atoms, a vinyl group, an allyl group, or an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^{13}$ are either identical or different when a plurality of $R^{13}$ are present; and s is an integer from 0 to 3.

According to further aspect of the invention, a method for producing an olefin polymer includes polymerizing an olefin in the presence of the olefin polymerization catalyst.

Advantageous Effects of the Invention

When the solid catalyst component for olefin polymerization according to the invention is used to produce a propylene polymer or propylene-based block copolymer, these polymers have high isotacticity and broad molecular distribution. Therefore the flexural modulus of the resulting (co)polymer is improved as compared with the case of using a known solid catalyst component.

Description of Embodiments

Method for producing solid catalyst for olefin (co)polymerization (hereinafter may be referred to as solid catalyst component (I)") according to one embodiment of the invention includes bringing a magnesium compound, a tetravalent titanium halide compound, an electron donor compound represented by the general formula (1) and an electron donor compound represented by the general formula (2) into contact with each other, reacting a magnesium compound, a tetravalent titanium halide compound, an electron donor compound represented by the general formula (1) and an electron donor compound represented by the general formula (2) to obtain a solid component.

The magnesium compound (a) (hereinafter may be referred to as "component (a)" or "magnesium compound (a)") may be one or more compounds selected from a magnesium dihalide, a dialkylmagnesium, an alkylmagnesium halide, a dialkoxymagnesium, a diaryloxymagnesium, an alkoxymagnesium halide, a fatty acid magnesium salt, and the like. Among these, a magnesium dihalide, a mixture of a magnesium dihalide and a dialkoxymagnesium, are preferable, and a dialkoxymagnesium is particularly preferable.

Examples of the dialkoxymagnesium include dimethoxymagnesium, diethoxymagnesium, dipropoxymagnesium, dibutoxymagnesium, ethoxymethoxymagnesium, ethoxypropoxymagnesium, butoxyethoxymagnesium, and the like. These dialkoxymagnesiums may be produced by reacting magnesium metal with an alcohol in the presence of a halogen, a halogen-containing metal compound, or the like. These dialkoxymagnesiums may be used either alone or in combination.

It is preferable to use a granular or powdery dialkoxymagnesium when producing the solid catalyst component used in connection with one embodiment of the invention. The dialkoxymagnesium may have an indefinite shape or a spherical shape. For example, when using a spherical dialkoxymagnesium, a polymer powder obtained by polymerization has a better particle shape and a narrow particle size distribution. This improves the handling capability of the polymer powder during polymerization, and eliminates problems such as clogging caused by a fine powder included in the polymer powder.

The spherical dialkoxymagnesium need not necessarily have a perfect spherical shape, but may have an elliptical shape or a potato-like shape. The ratio (l/w) of the major axis diameter l to the minor axis diameter w of the spherical dialkoxymagnesium is 3 or less, preferably 1 to 2, and more preferably 1 to 1.5.

The average particle size $D_{50}$ (i.e., the particle size at 50% in the cumulative volume particle size distribution) of the dialkoxymagnesium measured using a laser diffraction/scattering particle size distribution analyzer is preferably 1 to 200 μm, and more preferably 5 to 150 μm. The average particle size of the spherical dialkoxymagnesium is preferably 1 to 100 μm, more preferably 5 to 50 μm, and still more preferably 10 to 40 μm. It is preferable that the spherical dialkoxymagnesium have a narrow particle size distribution, and have a low fine powder content and a low coarse powder content. More specifically, it is preferable that the spherical dialkoxymagnesium have a content of particles having a particle size (measured using a laser diffraction/scattering particle size distribution analyzer) equal to or less than 5 μm of 20% or less, and more preferably 10% or less. It is preferable that the spherical dialkoxymagnesium have a content of particles having a particle size equal to or more than 100 μm of 10% or less, and more preferably 5% or less.

The particle size distribution $\ln(D_{90}/D_{10})$ (where, $D_{90}$ is the particle size at 90% in the cumulative volume particle size distribution, and $D_{10}$ is the particle size at 10% in the cumulative volume particle size distribution) of the spherical dialkoxymagnesium is preferably 3 or less, and more preferably 2 or less. The spherical dialkoxymagnesium may be produced using the method disclosed in JP-A-58-41832, JP-A-62-51633, JP-A-3-74341, JP-A-4-368391, JP-A-8-73388, or the like.

Examples of the titanium compound (b) (hereinafter may be referred to as "component (b)" or "titanium halide compound (b)") include a tetravalent titanium compound represented by the following general formula (6).

$$\text{Ti}(OR^{14})_t X_{4-t} \tag{6}$$

wherein $R^{14}$ is a hydrocarbon group having 1 to 10 carbon atoms, provided that a plurality of $R^{14}$ are either identical or different when a plurality of $OR^{14}$ are present, X is a halogen group, provided that a plurality of X are either identical or different when a plurality of X are present, and t is an integer from 0 to 4.

The tetravalent titanium compound represented by the general formula (6) is one compound, or two or more compounds, selected from an alkoxytitanium, a titanium halide, and an alkoxytitanium halide. Specific examples of the tetravalent titanium compound include titanium tetrahalides such as titanium tetrafluoride, titanium tetrachloride, titanium tetrabromide, and titanium tetraiodide, alkoxytitanium trihalides such as methoxytitanium trichloride, ethoxytitanium trichloride, propoxytitanium trichloride, and n-butoxytitanium trichloride, dialkoxytitanium dihalides such as dimethoxytitanium dichloride, diethoxytitanium dichloride, dipropoxytitanium dichloride, and di-n-butoxytitanium dichloride, and trialkoxytitaniurn halides such as trimethoxytitanium chloride, triethoxytitanium chloride, tripropoxytitanium chloride, and tri-n-butoxytitanium chloride. Among these, halogen-containing titanium compounds are preferable, titanium tetrahalides such as titanium tetrachloride, titanium tetrabromide, and titanium tetraiodide are more preferable, and titanium tetrachloride is particularly preferable. These titanium compounds may be used either alone or in a combination. The tetravalent titanium compound represented by the general formula (6) may be used in a state in which the tetravalent titanium compound is diluted with a hydrocarbon compound, a halogenated hydrocarbon compound, or the like.

The electron donor compound represented by the general formula (1) (hereinafter may be referred to as "compound (c)" or "electron donor compound (c)") includes a phthalic diester, substituted phthalic diester, a halogen-substituted phthalic diester, an alkyl-substituted phthalic diester, and a haloalkoxyl-substituted phthalic diester.

Examples of the alkyl group having 1 to 8 carbon atoms represented by $R^1$ in general formula (1) include a methyl group, an ethyl group, a n-propyl group, an isopropyl group, a n-butyl group, an isobutyl group, a t-butyl group, a n-pentyl group, an isopentyl group, a neopentyl group, a n-hexyl group, am isohexyl group, a 2,2-dimethylbutyl group, a 2,2-dimethylpentyl group, an isooctyl group, and a 2,2-dimethylhexyl group. Examples of the halogen atom represented by $R^1$ include a fluorine atom, a chlorine atom, a bromine atom, and an iodine atom.

$R^1$ is preferably a methyl group, a bromine group, or fluorine atom, and more preferably a methyl group or a bromine atom.

Examples of the alkyl group having 1 to 6 carbon atoms represented by $R^2$ and $R^3$ include a methyl group, an ethyl group, a n-propyl group, an isopropyl group, a n-butyl group, an isobutyl group, a t-butyl group, a n-pentyl group, an isopentyl group, a neopentyl group, a n-hexyl group, and an isohexyl group. Among these, ethyl group, a n-propyl group, a n-butyl group, and an isobutyl group are preferable.

k that is the number of substituents $R^1$ is 0, 1, or 2, $R^1$ are either identical or different when k is 2. In this case, it is preferable $R^1$ substitute the hydrogen atoms at the positions 4 and 5 of the benzene ring in the formula (1). When k is 1, it is preferable $R^1$ substitutes the hydrogen atom at the position 3, 4, or 5 of the benzene ring in the general formula (1).

Specific examples of the phthalic diester include dimethyl phthalate, diethyl phthalate, di-n-propyl phthalate, diisopropyl phthalate, di-n-butyl phthalate, ethylmethyl phthalate, methyl(isopropyl) phthalate, ethyl(n-propyl) phthalate, ethyl (n-butyl) phthalate, ethyl(isobutyl) phthalate, di-n-pentyl phthalate, diisopentyl phthalate, dineopentyl phthalate, and di-n-hexyl phthalate. These compounds may be used either alone or in combination.

Specific examples of the substituted phthalic diester include diethyl 4-methylphthalate, di-n-butyl 4-methylphthalate, diisobutyl 4-methylphthalate, dineopentyl 4-bromophthalate, diethyl 4-bromophthalate, di-n-butyl 4-bromophthalate, diisobutyl 4-bromophthalate, dineopentyl 4-methylphthalate, dineopentyl 4, 5-dimethylphthalate, dineopentyl 4-methylphthalate, dineopentyl 4-ethylphthalate, t-butylneopentyl 4-methylphthalate, t-butylneopentyl 4-ethylphthalate, dineopentyl 4, 5-diethylphthalate, t-butylneopentyl 4, 5-dimethylphthalate, t-butylneopentyl 4, 5-diethylphthalate, dineopentyl 3-fluorophthalate, dineopentyl 3-chlorophthalate, and dineopentyl 3-fluorophthalate, dineopentyl 4-bromophthalate.

The above esters may preferably be used in combination. In this case, the esters are preferably combined so that the total number of carbon atoms of the alkyl group(s) of one ester differs from that of another ester by 4 or more.

The electron donor compound represented by the general formula (2) (hereinafter may be referred to as "compound (d)" or "electron donor compound (d)") is an alkylidene malonate compound as essential component.

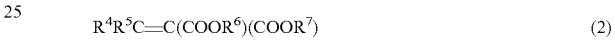

$$R^4R^5C=C(COOR^6)(COOR^7) \qquad (2)$$

wherein $R^4$ and $R^5$ are independently an atom or a group selected from a hydrogen atom, a halogen, a linear alkyl group having 1 to 20 carbon atoms, a branched alkyl group having 3 to 20 carbon atoms, a vinyl group, a linear or branched alkenyl group having 3 to 20 carbon atoms, a linear or branched halogen-substituted alkyl group having 2 to 20 carbon atoms, a cycloalkyl group having 3 to 20 carbon atoms, a cycloalkenyl group having 3 to 20 carbon atoms, an aromatic hydrocarbon group having 6 to 20 carbon atoms, a nitrogen-containing group, an oxygen-containing group, a phosphorus-containing group, and a silicon-containing group, provided that $R^4$ and $R^5$ are either identical or different, and optionally bond to each other to form a ring, and $R^5$ has 2 or more carbon atoms when $R^4$ is a hydrogen atom or a methyl group, and $R^6$ and $R^7$ are independently a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 20 carbon atoms, provided that $R^6$ and $R^7$ are either identical or different.

Examples of the halogen in the general formula (2) include fluorine, chlorine, bromine, and iodine. Among these, chlorine, bromine, and iodine are preferable, and chlorine and bromine are particularly preferable. Examples of the linear alkyl group having 1 to 20 carbon atoms include a methyl group, an ethyl group, a n-propyl group, a n-butyl group, a n-pentyl group, a n-hexyl group, a n-heptyl group, a n-octyl group, an n-nonyl group, an n-decyl group, and the like.

Examples of the branched alkyl group having 3 to 20 carbon atoms in the general formula (2) include alkyl groups that include a secondary carbon atom or a tertiary carbon atom (e.g., isopropyl group, isobutyl group, t-butyl group, isopentyl group, and neopentyl group). Examples of the linear alkenyl group having 3 to 20 carbon atoms in the general formula (2) include an n-propenyl group, an n-butenyl group, an n-pentenyl group, an n-hexenyl group, an n-heptenyl group, an n-octenyl group, an n-nonenyl group, an n-decenyl group, and the like. Examples of the branched alkenyl group having 3 to 20 carbon atoms include alkenyl groups that include a secondary carbon atom or a tertiary carbon atom (e.g., isopropenyl group, isobutenyl group, t-butenyl group, isopentenyl group, and neopentenyl group)

Examples of the linear or branched halogen-substituted alkyl group having 2 to 20 carbon atoms include a methyl halide group, an ethyl halide group, ann-propyl halide group, an isopropyl halide group, an n-butyl halide group, an isobutyl halide group, an n-pentyl halide group, an n-hexyl halide group, an n-heptyl halide group, an n-octyl halide group, a nonyl halide group, and a decyl halide group. Examples of the halogen include fluorine, chlorine, bromine, and iodine.

Examples of the cycloalkyl group having 3 to 20 carbon atoms in the general formula (2) include a cyclopropyl group, a cyclobutyl group, a cyclopentyl group, a cyclohexyl group, a cycloheptyl group, a cyclooctyl group, a cyclononyl group, a cyclodecyl group, and the like. Examples of the cycloalkenyl group having 3 to 20 carbon atoms include a cyclopropenyl group, a cyclobutenyl group, a cyclopentenyl group, a cyclohexenyl group, a cycloheptenyl group, a cyclooctenyl group, a cyclononenyl group, a cyclodecenyl group, and the like.

Examples of the aromatic hydrocarbon group having 6 to 20 carbon atoms in the general formula (2) include a phenyl group, a methylphenyl group, a dimethylphenyl group, an ethylphenyl group, a benzyl group, a 1-phenylethyl group, a 2-phenylethyl group, a 2-phenylpropyl group, a 1-phenylbutyl group, a 4-phenylbutyl group, a 2-phenylheptyl group, a tolyl group, a xylyl group, a naphthyl group, and the like.

The number of carbon atoms of $R^5$ is 2 or more when $R^4$ is a hydrogen atom or a methyl group. $R^4$ and $R^5$ in the general formula (2) optionally bond to each other to form a ring. Examples of a ring formed by $R^4$, $R^5$ and the carbon atom bonded to $R^4$ and $R^5$ include a cycloalkyl ring, a fluorenyl ring, an indenyl ring, an imidazole ring, a piperidinyl ring, and the like.

It is preferable that $R^4$ and $R^5$ in the general formula (2) be a hydrogen atom, a linear alkyl group having 1 to 6 carbon atoms, a branched alkyl group having 3 to 6 carbon atoms, a vinyl group, a linear or branched alkenyl group having 3 to 6 carbon atoms, a cycloalkyl group having 5 or 6 carbon atoms, a cycloalkenyl group having 5 or 6 carbon atoms, or an aromatic hydrocarbon group having 6 to 10 carbon atoms. It is particularly preferable that $R^4$ be a hydrogen atom or a linear alkyl group having 1 to 6 carbon atoms, and $R^5$ be a linear alkyl group having 1 to 6 carbon atoms, a branched alkyl group having 3 to 6 carbon atoms, a cycloalkyl group having 5 or 6 carbon atoms, or an aromatic hydrocarbon group having 6 to 10 carbon atoms. It is preferable that $R^6$ and $R^7$ be a linear alkyl group having 1 to 10 carbon atoms or a branched alkyl group having 3 to 8 carbon atoms. It is particularly preferable that $R^6$ and $R^7$ be a linear alkyl group having 1 to 4 carbon atoms or a branched alkyl group having 3 or 4 carbon atoms.

Examples of a preferable ester compound (d) represented by the general formula (1) include dimethyl propylidenemalonate, diethyl propylidenemalonate, di-n-propyl propylidenemalonate, diisobutyl propylidenemalonate, and di-n-butyl propylidenemalonate; dimethyl butylidenemalonate, diethyl butylidenemalonate, di-n-propyl butylidenemalonate, diisobutyl butylidenemalonate, and di-n-butyl butylidenemalonate; dimethyl pentylidenemalonate, diethyl pentylidenemalonate, di-n-propyl pentylidenemalonate, diisobutyl pentylidenemalonate, and di-n-butyl pentylidenemalonate; dimethyl hexylidenemalonate, diethyl hexylidenemalonate, di-n-propyl hexylidenemalonate, diisobutyl hexylidenemalonate, and di-n-butyl hexylidenemalonate; dimethyl(2-methylpropylidene)malonate, diethyl(2-methylpropylidene)malonate, di-n-propyl(2-methylpropylidene)malonate, diisobutyl(2-methylpropylidene)malonate, di-n-butyl(2-methylpropylidene)malonate, and diethyl(2,2-dimethylpropylidene)malonate; dimethyl(2-methylbutylidene)malonate, diethyl(2-methylbutylidene)malonate, di-n-propyl(2-methylbutylidene)malonate, diisobutyl(2-methylbutylidene)malonate, and di-n-butyl(2-methylbutylidene)malonate; dimethyl(2-ethylbutylidene)malonate, diethyl(2-ethylbutylidene)malonate, di-n-propyl(2-ethylbutylidene)malonate, diisobutyl(2-ethylbutylidene)malonate, and di-n-butyl(2-ethylbutylidene)malonate; dimethyl(2-ethylpentylidene)malonate, diethyl(2-ethylpentylidene)malonate, di-n-propyl(2-ethylpentylidene)malonate, diisobutyl(2-ethylpentylidene)malonate, and di-n-butyl(2-ethylpentylidene)malonate; dimethyl(2-isopropylbutylidene)malonate, diethyl(2-isopropylbutylidene)malonate, di-n-propyl(2-isopropylbutylidene)malonate, diisobutyl(2-isopropylbutylidene)malonate, and di-n-butyl(2-isopropylbutylidene)malonate; dimethyl(3-methylbutylidene)malonate, diethyl(3-methylbutylidene)malonate, di-n-propyl(3-methylbutylidene)malonate, diisobutyl(3-methylbutylidene)malonate, and di-n-butyl(3-methylbutylidene)malonate; dimethyl(2,3-dimethylbutylidene)malonate, diethyl(2,3-dimethylbutylidene)malonate, di-n-propyl(2,3-dimethylbutylidene)malonate, diisobutyl(2,3-dimethylbutylidene)malonate, and di-n-butyl(2,3-dimethylbutylidene)malonate; dimethyl(2-n-propylbutylidene)malonate, diethyl(2-n-propylbutylidene)malonate, di-n-propyl(2-n-propylbutylidene)malonate, diisobutyl(2-n-propylbutylidene)malonate, and di-n-butyl(2-n-propylbutylidene)malonate; dimethyl(2-isobutyl-3-methylbutylidene)malonate, diethyl(2-isobutyl-3-methylbutylidene)malonate, di-n-propyl(2-isobutyl-3-methylbutylidene)malonate, diisobutyl(2-isobutyl-3-methylbutylidene)malonate, and di-n-butyl(2-isobutyl-3-methylbutylidene)malonate; dimethyl(2-n-butylpentylidene)malonate, diethyl(2-n-butylpentylidene)malonate, di-n-propyl(2-n-butylpentylidene)malonate, diisobutyl(2-n-butylpentylidene)malonate, and di-n-butyl(2-n-butylpentylidene)malonate; dimethyl(2-n-pentylhexylidene)malonate, diethyl(2-n-pentylhexylidene)malonate, di-n-propyl(2-n-pentylhexylidene)malonate, diisobutyl(2-n-pentylhexylidene)malonate, and di-n-butyl(2-n-pentylhexylidene)malonate; dimethyl(cyclohexylmethylene)malonate, diethyl(cyclohexylmethylene)malonate, di-n-propyl(cyclohexylmethylene)malonate, diisobutyl(cyclohexylmethylene)malonate, and di-n-butyl(cyclohexylmethylene)malonate; dimethyl(cyclopentylmethylene)malonate, diethyl(cyclopentylmethylene)malonate, di-n-propyl(cyclopentylmethylene)malonate, diisobutyl(cyclopentylmethylene)malonate, and di-n-butyl(cyclopentylmethylene)malonate; dimethyl(1-methylpropylidene)malonate, diethyl(1-methylpropylidene)malonate, di-n-propyl(1-methylpropylidene)malonate, diisobutyl(1-methylpropylidene)malonate, and di-n-butyl(1-methylpropylidene)malonate, dimethyl(di-t-butylmethylene)malonate, diethyl(di-t-butylmethylene)malonate, di-n-propyl(di-t-butylmethylene)malonate, diisobutyl(di-t-butylmethylene)malonate, and di-n-butyl(di-t-butylmethylene)malonate; dimethyl(diisobutylmethylene)malonate, diethyl(diisobutylmethylene)malonate, di-n-propyl(diisobutylmethylene)malonate, diisobutyl(diisobutylmethylene)malonate, and di-n-butyl (diisobutylmethylene)malonate; dimethyl(diisopropylmethylene)malonate, diethyl(diisopropylmethylene)malonate, di-n-propyl(diisopropylmethylene)malonate, diisobutyl(diisopropylmethylene)malonate, and di-n-butyl(diisopropylmethylene)malonate; dimethyl(dicyclopentylmethylene)malonate, diethyl(dicyclopentylmethylene)malonate, di-n-propyl(dicyclopentylmethylene)malonate, diisobutyl(dicyclopentylmethylene)malonate, and di-n-butyl(dicyclopentylmethylene)malonate; dimethyl(dicyclohexylmethylene)malonate, diethyl(dicyclohexylmethylene)malonate, di-n-propyl(dicyclohexylmethylene)malonate, diisobutyl(dicyclohexylmethylene)malonate, and di-n-butyl(dicyclohexylmethylene)malonate; dimethyl benzylidenemalonate, diethyl benzylidenemalonate, di-n-propyl benzylidenemalonate, diisobutyl benzylidenemalonate, and di-n-butyl benzylidenemalonate; dimethyl(1-methylbenzylidene)malonate, diethyl(1-methylbenzylidene)malonate, di-n-propyl(1-methylbenzylidene)malonate, diisobutyl(1-methylbenzylidene)malonate, and di-n-butyl(1-methylbenzylidene)malonate, dimethyl(1-ethylbenzylidene)malonate, diethyl(1-ethylbenzylidene)malonate, di-n-propyl(1-ethylbenzylidene)malonate, diisobutyl(1-ethylbenzylidene)malonate, and di-n-butyl(1-ethylbenzylidene)malonate, dimethyl(1-n-propylbenzylidene)malonate, diethyl(1-n-propylbenzylidene)malonate, di-n-propyl(1-n-propylbenzylidene)malonate, diisobutyl(1-n-propylbenzylidene)malonate, and di-n-butyl(1-n-propylbenzylidene)malonate, dimethyl(1-isopropylbenzylidene)malonate, diethyl(1-isopropylbenzylidene)malonate, di-n-propyl(1-isopropylbenzylidene)malonate, diisobutyl(1-isopropylbenzylidene)malonate, and di-n-butyl(1-isopropylbenzylidene)malonate, dimethyl(1-n-butylbenzylidene)malonate, diethyl(1-n-butylbenzylidene)malonate, di-n-propyl(1-n-butylbenzylidene)malonate, diisobutyl(1-n-butylbenzylidene)malonate, and di-n-butyl(1-n-butylbenzylidene)malonate, dimethyl(1-isobutylbenzylidene)malonate, diethyl(1-isobutylbenzylidene)malonate, di-n-propyl(1-isobutylbenzylidene)malonate, diisobutyl(1-isobutylbenzylidene)malonate, and di-n-butyl(1-isobutylbenzylidene)malonate, dimethyl(1-t-butylbenzylidene)malonate, diethyl(1-t-butylbenzylidene)malonate, di-n-propyl(1-t-butylbenzylidene)malonate, diisobutyl(1-t-butylbenzylidene)malonate, and di-n-butyl(1-t-butylbenzylidene)malonate, dimethyl(1-n-pentylbenzylidene)malonate, diethyl(1-n-pentylbenzylidene)malonate, di-n-propyl(1-n-pentylbenzylidene)malonate, diisobutyl(1-n-pentylbenzylidene)malonate, and di-n-butyl(1-n-pentylbenzylidene)malonate, dimethyl(2-methylphenylmethylene)malonate, diethyl(2-methylphenylmethylene)malonate, di-n-propyl(2-methylphenylmethylene)malonate, diisobutyl(2-methylphenylmethylene)malonate, and di-n-butyl(2-methylphenylmethylene)malonate; dimethyl(2,6-dimethylphenylmethylene)malonate, diethyl(2,6-dimethylphenylmethylene)malonate, di-n-propyl(2,6-dimethylphenylmethylene)malonate, diisobutyl(2,6-dimethylphenylmethylene)malonate, and di-n-butyl(2,6-dimethylphenylmethylene)malonate; dimethyl(1-methyl-1-(2-methylphenyl)methylene)malonate, diethyl(1-methyl-1-(2-methylphenyl)methylene)malonate, di-n-propyl(1-methyl-1-(2-methylphenyl)methylene)malonate, diisobutyl(1-methyl-1-(2-methylphenyl)methylene)malonate, and di-n-butyl(1-methyl-1-(2-methylphenyl)methylene)malonate, dimethyl(2-methylcyclohexylmethylene)malonate, diethyl(2-methylcyclohexylmethylene)malonate, di-n-propyl(2-methylcyclohexylmethylene)malonate, diisobutyl(2-methylcyclohexylmethylene)malonate, and di-n-butyl(2-methylcyclohexylmethylene)malonate; dimethyl(2,6-dimethylcyclohexylmethylene)malonate, diethyl(2,6-dimethylcyclohexylmethylene)malonate, di-n-propyl(2,6-dimethylcyclohexylmethylene)malonate, diisobutyl(2,6-dimethylcyclohexylmethylene)malonate, and di-n-butyl(2,6-dimethylcyclohexylmethylene)malonate; dimethyl(1-methyl-1-(2-methylcyclohexyl)methylene)malonate, diethyl(1-methyl-1-(2-methylcyclohexyl)methylene)malonate, di-n-propyl(1-methyl-1-(2-methylcyclohexyl)methylene)malonate, diisobutyl(1-methyl-1-(2-methylcyclohexyl)methylene)malonate, and di-n-butyl(1-methyl-1-(2-methylcyclohexyl)methylene)malonate, dimethyl(naphthylmethylene)malonate, diethyl(naphthylmethylene)malonate, di-n-propyl(naphthylmethylene)malonate, diisobutyl(naphthylmethylene)malonate, and di-n-butyl(naphthylmethylene)malonate; dimethyl(1-n-hexylbenzylidene)malonate, diethyl(1-n-hexylbenzylidene)malonate, di-n-propyl(1-n-hexylbenzylidene)malonate, diisobutyl(1-n-hexylbenzylidene)malonate, and di-n-butyl(1-n-hexylbenzylidene)malonate. These compounds may be used either alone or in combination.

Two kinds of electron donor of compound (electron donor compound (c) and electron donor compound (d) are fed during the reaction of magnesium compound (a) and titanium halide compound (b) simultaneously, or step by step. If the reaction steps between magnesium compound (a) and titanium halide compound (b) are plural, electron donor compound (c) and electron donor compound (d) are fed at the same reaction step or the different steps each by each. If they are fed at the different steps, the order of electron donor compound (c) and electron donor compound (d) are not restricted. Preferablly electron donor compound (c) are fed at the first step, and compound (d) are fed simultaneously at the first step, or at the latter steps. More preferably both electron donor compound (c) and electron donor compound (d) are fed at least at the first step simultaneously or step by step.

Electron donor compound (c) and electron donor compound (d) can be used not only one time but also several times and at several steps.

The content of titanium, magnesium, the halogen (halogen atoms), the component (c), and component (d) in the solid catalyst component (I) is not particularly limited. The content of titanium in the solid catalyst component (I) is 0.1 to 10 wt %, preferably 0.5 to 8.0 wt %, and more preferably 1.0 to 5.0 wt %. The content of magnesium in the solid catalyst component (I) is 10 to 40 wt %, preferably 10 to 30 wt %, and more preferably 13 to 25 wt %. The content of the halogen (halogen atoms) in the solid catalyst component (I) is 20 to 89 wt %, preferably 30 to 85 wt %, and more preferably 40 to 75 wt %. The content of the electron donor component (c) in the solid catalyst component (I) is 0.5 to 40 wt %, preferably 1 to 30 wt %, and more preferably 2 to 25 wt %. The content of the electron donor component (d) in the solid catalyst component (I) is 0.5 to 20 wt %, preferably 1 to 15 wt %, and more preferably 2 to 10 wt %.

Examples and specific examples of the organosilicon compound that includes an Si—O—C linkage and the organosilicon compound that includes an Si—N—C linkage include those mentioned later in connection with the organosilicon compound represented by the general formula (4) and the organosilicon compound represented by the general formula (5). Examples of the organoaluminum compound include those mentioned later in connection with the organoaluminum compound represented by the general formula (3). These reagents may be used either alone or in combination.

The term "unsaturated alkyl group" refers to a vinyl group or an alkenyl group. Examples of the organosilicon compound include vinyl group-containing alkylsilanes, vinyl group-containing alkoxysilanes, vinyl group-containing cycloalkylsilanes, vinyl group-containing phenylsilanes, vinyl group-containing halogenated silanes, vinyl group-containing halogenated alkylsilanes, alkenyl group-containing vinylsilanes, alkenyl group-containing alkylsilanes, alkenyl group-containing alkoxysilanes, alkenyl group-containing cycloalkylsilanes, alkenyl group-containing phenylsilanes, alkenyl group-containing halogenated silanes, and alkenyl group-containing halogenated alkylsilanes. The vinyl group is represented by $CH_2=CH-$, and the alkenyl group is represented by $CH_2=CH-(CH_2)_u-$. Among these, vinyltrialkylsilanes, allyltrialkylsilanes, divinyldialkylsilanes, diallyldialkylsilanes, trivinylalkylsilanes, and triallylalkylsilanes are preferable, and allyldimethylvinylsilane, diallyldimethylsilane, triallylmethylsilane, di-3-butenyldimethylsilane, diallyldichlorosilane, and allyltriethylsilane are particularly preferable. These organosilicon compounds that include an unsaturated alkyl group may be used either alone or in combination.

Method for producing solid catalyst component (I) for copolymerization

The solid catalyst component (I) is produced by bringing a magnesium compound (a), a tetravalent titanium halide compound (b), an optional halogen compound other than the titanium compound, the compound (c) represented by the general formula (1), and the compound (d) represented by the general formula (2) into contact with each other.

One embodiment of the invention may be the method comprising:

a first step that brings a magnesium compound and a tetravalent titanium halide compound into contact with each other to make a reaction, followed by removing the reaction medium and optionally washing;

a second step that brings a tetravalent titanium halide compound into contact with a product obtained by the first step to make a reaction, followed by removing the reaction medium and optionally washing;

wherein compounds selected respectively from an organic compound represented by the following general formula (1) and an organic compound represented by the following general formula (2) are further added in at least either of the first step and the second step.

Another embodiment of the invention may be the method further comprising:

a third step that brings a an organic compound represented by the following general formula (1) and an organic compound represented by the following general formula (2) into contact with a product obtained by the above mentioned second step to make a reaction, followed by removing the reaction medium and optionally washing.

A saturated hydrocarbon solvent or an unsaturated hydrocarbon solvent that does not dissolve a magnesium compound is used as a medium that cannot dissolve the component (a).

The saturated hydrocarbon solvent or the unsaturated hydrocarbon solvent is safe and has high industrial versatility. Examples of the saturated hydrocarbon solvent or the unsaturated hydrocarbon solvent include a linear or branched aliphatic hydrocarbon compound having a boiling point of 50 to 200° C., such as hexane, heptane, decane, and methylheptane, an alicyclic hydrocarbon compound having a boiling point of 50 to 200° C., such as cyclohexane, ethylcyclohexane, and decahydronaphthalene, and an aromatic hydrocarbon compound having a boiling point of 50 to 200° C., such as toluene, xylene, and ethylbenzene. Among these, a linear aliphatic hydrocarbon compound having a boiling point of 50 to 200° C. (e.g., hexane, heptane, and decane), and an aromatic hydrocarbon compound having a boiling point of 50 to 200° C. (e.g., toluene, xylene, and ethylbenzene) are preferable. These solvents may be used either individually or in combination.

The component (a) used to produce the solid catalyst component (I) is the same as the component (a) included in the solid catalyst component (I), and description thereof is omitted.

The titanium component (b) used to produce the solid catalyst component (I) is the same as the titanium component (b) included in the solid catalyst component (I), and description thereof is omitted.

A halide compound other than the titanium component (b) that is optionally used to produce the solid catalyst component (I) is the same as the=halide compound that is optionally included in the solid catalyst component (I), and description thereof is omitted.

The electron donor component (c) and electron donor component (d) used to produce the solid catalyst component (I) is the same as the electron donor component (c) and electron donor component (d) included in the solid catalyst component (I), and description thereof is omitted.

An electron donor component that is optionally used to produce the solid catalyst component (I) is the same as the external electron donor compound (f) that is discussed later, and description thereof is omitted.

(1) A dialkoxymagnesium is suspended in a hydrocarbon solvent, and brought into contact with titanium tetrachloride. The mixture is heated, and brought into contact with the component (a) and the component (b) (optional) (either simultaneously or successively) to obtain a solid product. The solid product is washed with a hydrocarbon solvent, and brought into contact with titanium tetrachloride in the presence of a hydrocarbon solvent to produce the solid catalyst component (I). In this case, the solid component may be heated in the presence or absence of a hydrocarbon solvent. A treatment with the component (b) may optionally be added.

(2) A dialkoxymagnesium is suspended in a hydrocarbon solvent, and brought into contact with (reacted with) a titanium halide, the component (a), and the component (b) (optional) to obtain a solid product. The solid product is washed with an inert organic solvent, and brought into contact with (reacted with) a titanium halide in the presence of a hydrocarbon solvent to produce the solid catalyst component (I). In this case, the solid component and a titanium halide may be brought into contact with each other two or more times.

(3) A dialkoxymagnesium, and the component (a) are suspended in a hydrocarbon solvent, and brought into contact with (reacted with) a titanium halide to obtain a solid product. The solid product is washed with a hydrocarbon solvent, and brought into contact with a titanium halide in the presence of a hydrocarbon solvent to produce the solid catalyst component (I).

In order to further improve olefin polymerization activity and the stereoregularity of the resulting polymer, a titanium halide and a hydrocarbon solvent may be brought into contact with the solid catalyst component (I) (that has been washed) at 20 to 100° C., and the mixture may be heated to effect a reaction (secondary reaction), and washed with an inert organic solvent that is liquid at room temperature when implementing the methods (1) to (3). The above operation may be repeated 1 to 10 times.

The component (I) may suitably be produced using any of the methods (1) to (3). It is preferable to produce the solid catalyst component (I) by suspending a dialkoxymagnesium and the component (a) (or the component (b)) in a hydrocarbon solvent selected from a linear hydrocarbon, a branched aliphatic hydrocarbon, an alicyclic hydrocarbon, and an aromatic hydrocarbon, adding the suspension to a titanium halide to effect a reaction to obtain a solid product, washing the solid product with a hydrocarbon solvent, and bringing the component (b) (or the component (a)) into contact with the solid product in the presence of a hydrocarbon solvent.

It is also preferable to bring the solid catalyst component (I) obtained by the above method into contact with the organosilicon compound that includes an Si—O—C linkage, the organosilicon compound that includes an Si—N—C linkage, the organoaluminum compound (optional), from the viewpoint of improving the polymerization activity of the solid catalyst component, and improving the hydrogen response. The solid catalyst component (I) is brought into contact with these compounds in the presence of a hydrocarbon solvent. After bringing the solid catalyst component (I) into contact with each component, the mixture is sufficiently washed with a hydrocarbon solvent to remove unnecessary components. The solid catalyst component (I) may be repeatedly brought into contact with each compound.

The components are brought into contact with each other at −10 to 100° C., preferably 0 to 90° C., and particularly preferably 20 to 80° C. The contact time is 1 minute to 10 hours, preferably 10 minutes to 5 hours, and particularly preferably 30 minutes to 2 hours. The components may be used in an arbitrary ratio as long as the advantageous effects of the invention are not adversely affected. The organosilicon compound that includes an Si—O—C linkage, or the organosilicon compound that includes an Si—N—C linkage are normally used in an amount of 0.2 to 20 mol, preferably 0.5 to 10 mol, and particularly preferably 1 to 5 mol, per mol of the titanium atoms included in the solid catalyst component (I). The organoaluminurn compound is normally used in an amount of 0.5 to 50 mol, preferably 1 to 20 mol, and particularly preferably 1.5 to 10 mol, per mol of the titanium atoms included in the solid catalyst component (I).

It is preferable to remove the solvent from the resulting solid catalyst component (I) so that the weight ratio of the solvent relative to the solid component is 1/3 or less, and preferably 1/6 to 1/20, to obtain a powdery solid component.

The ratio of the components used when producing the solid catalyst component (I) is determined taking account of the production method. For example, the tetravalent titanium halide compound (b) is used in an amount of 0.5 to 100 mol, preferably 0.5 to 50 mol, and more preferably 1 to 10 mol, based on 1 mol of the magnesium compound (a). The solvent is used in an amount of 0.001 to 500 mol, preferably 0.001 to 100 mol, and more preferably 0.005 to 10 mol, based on 1 mol of the magnesium compound (a).

Propylene-Based Copolymerization Catalyst

A propylene-based block copolymer copolymerization catalyst (hereinafter may be referred to as "copolymerization catalyst") used in connection with one embodiment of the invention includes (I) the solid catalyst component (see above), (II) an organoaluminum compound (hereinafter may be referred to as "component (e)" or "organoaluminum compound (e)"), and (III) an external electron donor compound (hereinafter may be referred to as "component (f)" or "external electron donor compound (f)"). Note that the component (f) may not be used when the solid catalyst component (I) includes the organosilicon compound that includes an Si—O—C linkage, the organosilicon compound that includes an Si—N—C linkage, or the organoaluminum compound (reagent). Specifically, the catalyst that includes the solid catalyst component and the organoaluminum compound exhibits excellent polymerization activity, and ensures excellent hydrogen response, even when the component (f) is not used.

The organoaluminum compound (II) is not particularly limited as long as the organoaluminum compound (II) is a compound represented by the general formula (3).

$$R^8_p AlQ_{3-p} \quad (3)$$

wherein $R^8$ is an alkyl group having 1 to 6 carbon atoms; Q is a hydrogen atom or halogen atom; and p is an integer from 0 to 3;

Note that $R^8$ is preferably an ethyl group or an isobutyl group, Q is preferably a hydrogen atom, a chlorine atom, or a bromine atom, and p is preferably 2, 2.5, or 3, and particularly preferably 3.

Specific examples of the organoaluminum compound include trialkylaluminums such as triethylaluminum, triisopropylaluminum, tri-n-butylaluminum, tri-n-hexylaluminum, and triisobutylaluminum, alkylaluminum halides such as diethylaluminum chloride and diethylaluminum bromide, diethylaluminum hydride, and the like. Among these, alkylaluminum halides such as diethylaluminum chloride, and trialkylaluminums such as triethylaluminum, tri-n-butylaluminum, and triisobutylaluminum are preferable, and triethylaluminum and triisobutylaluminum are particularly preferable. These organoaluminum compounds may be used either alone or in combination.

Examples of the external electron donor compound (III) used to produce the copolymerization catalyst used in connection with one embodiment of the invention include an organic compound that includes an oxygen atom or a nitrogen atom. Examples of the organic compound that includes an oxygen atom or a nitrogen atom include an alcohol, a phenol, an ether, an ester, a ketone, an acid halide, an aldehyde, an amine, an amide, a nitrile, an isocyanate, and an organosilicon compound. The external electron donor compound (III) may be an organosilicon compound that includes an Si—O—C linkage, an aminosilane compound that includes an Si—N—C linkage, or the like.

Among these, an ester such as ethyl benzoate, ethyl p-methoxybenzoate, ethyl p-ethoxybenzoate, methyl p-toluate, ethyl p-toluate, methyl anisate, and ethyl anisate, a 1,3-diether, an organosilicon compound that includes an Si—O—C linkage, and an aminosilane compound that includes an Si—N—C linkage are preferable, and an organosilicon compound that includes an Si—O—C linkage, an aminosilane compound that includes an Si—N—C linkage, and a 2-substituted 1,3-diether are particularly preferable.

Examples of the organosilicon compound that includes an Si—O—C linkage that may be used as the external electron donor compound (III) include an organosilicon compound represented by the following general formula (4).

$$R^9_q Si(OR^{10})_{4-q} \quad (4)$$

wherein $R^9$ is an alkyl group having 1 to 12 carbon atoms, a vinyl group, an alkenyl group having 3 to 12 carbon atoms, a cycloalkyl group having 3 to 12 carbon atoms, a cycloalkenyl group having 3 to 12 carbon atoms, an aromatic hydrocarbon group having 6 to 15 carbon atoms, or a substituted aromatic hydrocarbon group, provided that a plurality of R4 are either identical or different when a plurality of $R^9$ are present, $R^{10}$ is an alkyl group having 1 to 4 carbon atoms, a vinyl group, an alkenyl group having 3 to 12 carbon atoms, a cycloalkyl group having 3 to 6 carbon atoms, an aromatic hydrocarbon group having 6 to 12 carbon atoms, or a substituted aromatic hydrocarbon group having 7 to 12 carbon atoms, provided that a plurality of $R^{19}$ are either identical or different when a plurality of $R^{10}$ are present, and q is an integer from 0 to 3.

Examples of the aminosilane compound that includes an Si—N—C linkage that may be used as the external electron donor compound (III) include an aminosilane compound represented by the following general formula (5).

wherein $R^{11}$ and $R^{12}$ are a hydrogen atom, an alkyl group having 1 to 20 carbon atoms, a vinyl group, an alkenyl group having 3 to 20 carbon atoms, a cycloalkyl group having 3 to 20 carbon atoms, a cycloalkenyl group having 3 to 20 carbon atoms, or an aryl group having 6 to 20 carbon atoms, provided that $R^{11}$ and $R^{12}$ are either identical or different, and optionally bond to each other to form a ring, $R^{13}$ is an alkyl group having 1 to 20 carbon atoms, a vinyl group, an alkenyl group having 3 to 12 carbon atoms, an alkoxy group having 1 to 20 carbon atoms, a vinyloxy group, an alkenyloxy group having 3 to 20 carbon atoms, a cycloalkyl group having 3 to 20 carbon atoms, a cycloalkyloxy group having 3 to 20 carbon atoms, an aryl group having 6 to 20 carbon atoms, or an aryloxy group having 6 to 20 carbon atoms, provided that a plurality of $R^{13}$ are either identical or different when a plurality of $R^{13}$ are present, and s is an integer from 1 to 3.

Examples of the organosilicon compound represented by the general formula (4) or (5) include phenylalkoxysilanes, alkylalkoxysilanes, phenylalkylalkoxysilanes, cycloalkylalkoxysilanes, alkyl(cycloalkyl)alkoxysilanes, (alkylamino)alkoxysilanes, alkyl(alkyl amino)alkoxysilanes, cycloalkyl (alkyl amino)alkoxysilanes, tetraalkoxysilanes, tetrakis(alkylamino)silanes, alkyltris(alkylamino)silanes, dialkylbis(alkylamino)silanes, trialkyl(alkylamino)silanes, and the like. Specific examples of the organosilicon compound represented by the general formula (4) or (5) include n-propyltriethoxysilane, cyclopentyltriethoxysilane, phenyltrimethoxysilane, phenyltriethoxysilane, t-butyltrimethoxysilane, diisopropyldimethoxysilane, isopropylisobutyldimethoxysilane, diisopentyldimethoxysilane, bis(2-ethylhexyl)dimethoxysilane, t-butylmethyldimethoxysilane, t-butylethyldimethoxysilane, dicyclopentyldimethoxysilane, dicyclohexyldimethoxysilane, cyclohexylcyclopentyldimethoxysilane, cyclohexylmethyldimethoxysilane, tetraethoxysilane, tetrabutoxysilane, bis(ethyl amino)methylethylsilane, bis(ethylamino)-t-butylmethylsilane, bis(ethylamino)dicyclohexylsilane, dicyclopentylbis(ethylamino)silane, bis(methylamino) (methylcyclopentylamino)methylsilane, diethylaminotriethoxysilane, bis(cyclohexylamino)dimethoxysilane, bis(perhydroisoquinolino)dimethoxysilane, bis(perhydroquinolino)dimethoxysilane, ethyl(isoquinolino) dimethoxysilane, and the like. The external electron donor compound (III) may be one or more compounds selected from n-propyltriethoxysilane, phenyltrimethoxysilane, t-butylmethyldimetboxysilane, t-butylethyldimethoxysilane, diisopropyldimethoxysilane, isopropylisobutyldirnethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethyl amino)dicyclohexylsilane, dicyclopentylbis(ethylamino)silane, bis(perhydroisoquinolino)dimethoxysilane, diethylaminotriethoxysilane, and the like.

Method for copolymerizing propylene and a-olefin In one embodiment of the invention, propylene and an alpha-olefin are copolymerized in the presence of the copolymerization catalyst to produce a propylene-based block copolymer. The alpha-olefin may be at least one olefin selected from an a-olefin having 2 to 20 carbon atoms (excluding propylene having 3 carbon atoms). Examples of the alpha-olefin include ethylene, 1-butene, 1-pentene, 4-methyl-1-pentene, vinylcyclohexane, and the like. These a-olefins may be used either alone or in combination. Among these, ethylene and 1-butene are preferable, and ethylene is particularly preferable.

Examples of the copolymerization method used in connection with one embodiment of the invention include a slurry polymerization method that utilizes an inert hydrocarbon solvent such as cyclohexane or heptane, a bulk polymerization method that utilizes a solvent such as liquefied propylene, and a vapor-phase polymerization method that substantially does not utilize a solvent. A block copolymer can be obtained by repeatedly implementing such a polymerization method in a plurality of steps. A combination of the bulk polymerization method and the vapor-phase polymerization method, or a multistep vapor-phase polymerization method is preferable as the copolymerization method.

It is preferable to homopolymerize propylene, or copolymerize propylene and a small amount of a-olefin (particularly ethylene) in the first step, and copolymerize propylene and an alpha-olefin (particularly ethylene), or copolymerize propylene, ethylene, and 1-butene in the second step. Note that the first step and the second step may respectively be performed a plurality of times.

It is preferable to effect polymerization in the first step while adjusting the polymerization temperature and the polymerization time so that 20 to 90 wt % of the propylene-based block copolymer is obtained. It is preferable to introduce propylene and ethylene or another a-olefin in the second step, and polymerize the components so that the ratio of the rubber part such as an ethylene-propylene rubber (EPR) or an ethylene-propylene-1-butene ternary copolymer is 10 to 80 wt %.

The polymerization temperature in the first step and the second step is 200° C. or less, and preferably 100° C. or less. The polymerization pressure in the first step and the second step is 10 MPa or less, and preferably 5 MPa or less. The polymerization time in each step (the residence time when implementing continuous polymerization) is normally 1 minute to 5 hours. The copolymerization method used in connection with one embodiment of the invention may be implemented using a continuous polymerization method or a batch polymerization method. Each of the first-step polymerization reaction and the second-step polymerization reaction may be implemented in a single step or a plurality of steps. When the first-step polymerization reaction or the second-step polymerization reaction is implemented in a plurality of steps, each step may be implemented under identical conditions or different conditions. It is preferable that the second-step polymerization reaction be a vapor-phase polymerization reaction since elution of EPR from polypropylene (PP) particles can be suppressed.

The catalyst components may be used for copolymerization in an arbitrary ratio as long as the advantageous effects of the invention are not impaired. The organoaluminum compound (e) is normally used in an amount of 1 to 2000 mol, and preferably 50 to 1000 mol, per mol of the titanium atoms included in the solid catalyst component (I). The external electron donor compound (f) is normally used in an amount of 0.002 to 10 mol, preferably 0.01 to 2 mol, and particularly preferably 0.01 to 0.5 mol, per mol of the component (e). The components may be brought into contact with each other in an arbitrary order. It is desirable to add the organoaluminum compound (e) to the polymerization system, and bring the component (I) into contact with the organoaluminum compound (e).

When copolymerizing an olefin using the catalyst that includes the solid catalyst component, the organoaluminum compound, and the external electron donor compound (hereinafter may be referred to as "main polymerization"), it is desirable to effect preliminary polymerization prior to the main polymerization in order to further improve the catalytic activity, the stereoregularity, the particle properties of the resulting polymer, and the like. An olefin that is subjected to the main polymerization, or a monomer such as styrene, may be used for the preliminary polymerization.

The components and the monomer may be brought into contact with each other in an arbitrary order when effecting the preliminary polymerization. Note that it is preferable to add the component (e) to the preliminary polymerization system containing an inert gas atmosphere or an olefin gas atmosphere, bring the solid catalyst component (I) into contact with the component (e), and then bring the olefin (e.g., propylene), or a mixture of propylene and one or more additional olefins, into contact with the above mixture.

When effecting the preliminary polymerization using the component (f), it is desirable to add the component (e) to the preliminary polymerization system containing an inert gas atmosphere or an olefin gas atmosphere, bring the component (f) into contact with the component (e), bring the solid catalyst component (I) into contact with the mixture, and then bring the olefin (e.g., propylene), or a mixture of propylene and one or more additional olefins, into contact with the above mixture.

A large amount of rubber can be incorporated in the resulting block copolymer under identical conditions by utilizing the production method according to one embodiment of the invention that utilizes the above catalyst, and the resulting block copolymer can be applied to a wide range of products. It is also possible to achieve high sustainability of polymerization of the rubber part, and control the properties of the rubber part through multistep polymerization.

Copolymer of Propylene and a-Olefin

A block copolymer is normally a polymer that includes segments in which the composition of two or more monomers changes consecutively. Specifically, a block copolymer is normally a polymer in which two or more polymer chains (segments) that differ in polymer primary structure (e.g., type of monomer, type of comonomer, comonomer composition, comonomer content, comonomer sequence, and stereoregularity) are linked within one molecular chain. A propylene-based block copolymer obtained using the method according to one embodiment of the invention is characterized in that polymers that differ in monomer composition are produced by multistep polymerization. Specifically, the main part of the propylene-based block copolymer has a structure in which two or more polymers that differ in monomer composition are present in each polymer particle in a mixed state (some of the polymers are linked through the polymer chain).

The propylene-based block copolymer obtained using the method according to one embodiment of the invention exhibits moderate rigidity due to the presence of crystalline polypropylene, or a crystalline polypropylene-based random copolymer that includes crystalline polypropylene and a small amount of a-olefin (e.g., ethylene) (crystalline PP or homopolymerization part), and exhibits excellent impact resistance due to the presence of a random copolymer (e.g., ethylene-propylene rubber (EPR or rubber part)) obtained by second-step polymerization. The balance between rigidity and impact resistance varies depending on the ratio of crystalline PP and the rubber part. The propylene-based block copolymer obtained by the method according to one embodiment of the invention includes the rubber part in a high ratio since the polymerization activity (block ratio) of the rubber part obtained by second-step polymerization is high. Since a large amount of a-olefin (e.g., ethylene) is introduced into the random copolymer, the copolymer exhibits relatively high rigidity with respect to the amount of rubber part and the ethylene content in the crystalline part. The copolymer exhibits high impact strength with respect to a polymer that includes an identical rubber part.

EXAMPLES

The invention is further described below by way of examples. Note that the following examples are for illustration purposes only, and the invention is not limited to the following examples. In the examples and comparative examples, the sphericity of the dialkoxymagnesium particles, and the content of magnesium atoms, titanium atoms, halogen atoms, and the internal electron donor compound in the solid catalyst component were measured as described below.

Content of Magnesium Atoms in Solid Catalyst Component

The solid catalyst component from which the solvent component had been completely removed by heating (drying) under reduced pressure was weighed, and dissolved in a hydrochloric acid solution. After the addition of methyl orange (indicator) and a saturated ammonium chloride solution, the mixture was neutralized with aqueous ammonia, heated, cooled, and filtered to remove a precipitate (titanium hydroxide). A given amount of the filtrate was isolated preparatively, and heated. After the addition of a buffer and an EBT mixed indicator, magnesium atoms were titrated using an EDTA solution to determine the content of magnesium atoms in the solid catalyst component (EDTA titration method).

Content of Titanium Atoms in Solid Catalyst Component

The content of titanium atoms in the solid catalyst component was determined in accordance with the method (redox titration) specified in JIS M 8311-1997 ("Method for determination of titanium in titanium ores").

Content of Halogen Atoms in Solid Catalyst Component

The solid catalyst component from which the solvent component had been completely removed by heating (drying) under reduced pressure was weighed, and treated with a mixture of sulfuric acid and purified water to obtain an aqueous solution. A given amount of the aqueous solution was isolated preparatively, and halogen atoms were titrated with a silver nitrate standard solution using an automatic titration device ("COM-1500" manufactured by Hiranuma Sangyo Co., Ltd.) to determine the content of halogen atoms in the solid catalyst component (silver nitrate titration method).

Content of Internal Electron Donor Compound in Solid Catalyst Component

The content of the internal electron donor compound (first internal electron donor compound, second internal electron donor compound, and third internal electron donor compound) in the solid catalyst component was determined using a gas chromatograph ("GC-14B" manufactured by Shimadzu Corporation) under the following conditions. The number of moles of each component (each internal electron donor compound) was calculated from the gas chromatography measurement results using a calibration curve that was drawn in advance using the measurement results at a known concentration.

Measurement Conditions

Column: packed column (2.6 (diameter)×2.1 m, Silicone SE-30 10%, Chromosorb WAW DMCS 80/100, manufactured by GL Sciences Ltd.)
Detector: flame ionization detector (FID)
Carrier gas: helium, flow rate: 40 ml/min
Measurement temperature: vaporization chamber: 280° C., column: 225° C., detector: 280° C., or vaporization chamber: 265° C., column: 180° C., detector: 265° C.

Example 1

Synthesis of Solid Catalyst Component (A1)
(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter=43 μm), 80 ml (753 mmol) of toluene, and 4.0 ml (17.3 mmol) of di-n-propyl phthalate was added to the solution. The mixture was stirred at −5° C. for 1 hour, and heated to 110° C. 4.0 ml (17.2 mmol) of diethyl benzylidenemalonate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 170 ml of toluene and 30 ml (273 mmol) of titanium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 ml (182 mmol) of titanium tetrachloride, the mixture was heated to 80° C. After the addition of 0.5 ml (2.2 mmol) of di-n-propyl phthalate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step 170 ml (1600 mmol) of toluene was added to the reaction product slurry including the solid component (II) to adjust the concentration of titanium tetrachloride in the reaction mixture to 0.2 mass %, and the mixture was heated to 80° C. After the addition of 0.5 ml (2.2 mmol) of di-n-propyl phthalate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (A1) for olefin polymerization.

The solid catalyst component (A1) had a titanium atom content of 1.7 mass %, a total phthalic diester content of 14.6 mass %, and diethyl benzylidenemalonate content of 2.9 mass %.

Preparation of Propylene Polymerization Catalyst and Polymerization of Propylene An autoclave (internal volume: 2.0 l) equipped with a stirrer in which the internal atmosphere had been completely replaced by nitrogen gas, was charged with 1.3 mmol of triethylaluminum, 0.22 mmol of diethylaminotriethoxysilane, and the solid catalyst component (A1) (2.6 μmol on a titanium atom basis) to prepare a propylene polymerization catalyst (B1).

The autoclave was charged with the propylene polymerization catalyst, and further charged with liquefied propylene (17 mol). The liquefied propylene was subjected to preliminary polymerization at 20° C. for 5 minutes under a pressure of 1.1 MPa, heated, and polymerized at 70° C. for 15 minutes under 3.2 MPa. Followed by addition of 5.5 l of hydrogen gas, the liquefied propylene was polymerized at 70° C. for 45 minutes under 3.2 MPa to obtain a polypropylene.

The propylene polymerization activity per gram of the solid catalyst component, the melt flow rate (MFR) of the polymer, and the p-xylene-soluble content (XS) in the polymer were measured as described below. The results are shown in Table 1.

Propylene Polymerization Activity

The propylene polymerization activity per gram of solid catalyst component was calculated using the following expression.

Propylene polymerization activity(g-PP/g-catalyst)=mass (g) of polypropylene/mass(g) of solid catalyst component included in olefin polymerization catalyst Melt Flow Rate (MFR) of Polymer The melt flow rate (MFR) (melt flow index) (g/10 min.) of the polymer was measured in accordance with ASTM D1238 (JIS K 7210)

Xylene-Soluble Content (XS) in Polymer

A flask equipped with a stirrer was charged with 4.0 g of the polymer (polypropylene) and 200 ml of p-xylene. The external temperature was increased to be equal to the boiling point (about 150° C.) of xylene, and the polymer was dissolved over 2 hours while maintaining p-xylene contained in the flask at a temperature (137 to 138° C.) under the condition of boiling point. The solution was cooled to 23° C. over 1 hour, and an insoluble component and a soluble component was separated by filtration. A solution of the soluble component was collected, and p-xylene was evaporated by heating (drying) under reduced pressure. The weight of the residue was calculated, and the relative ratio (mass %) with respect to the polymer (polypropylene) was calculated to determine the xylene-soluble content (XS).

Evaluation of Flexural Modulus (FM)

The polymer (polypropylene) was injection-molded to prepare a property measurement specimen. The specimen was conditioned in a temperature-controlled room maintained at 23° C. for 144 hours or more, and in accordance with JIS K 7171, the flexural modulus (FM) (MPa) was measured using the specimen provided that a liquid/powder exudate was not observed on the surface thereof.

Note that the property measurement specimen was prepared as described below. 0.10 wt % of IRGANOX 1010 (manufactured by BASF), and 0.10 wt % of IRGAFOS 168 (manufactured by BASF), and 0.08 wt % of calcium stearate were added to the polymer (polypropylene), and the mixture was kneaded and granulated using a single-screw extruder to obtain pellets of the polymer(polypropylene). The pellets of the polymer (polypropylene) were introduced into an injection molding machine (mold temperature: 60° C., cylinder temperature: 230° C.), and injection-molded to prepare the property measurement specimen.

Molecular Weight and Molecular Weight Distribution of Polymer

The molecular weight and molecular weight distribution of the polymer were measured by gel permeation chromatography (GPC) ("GPCHLC-8321 GPC/HT" manufactured by Toso) under the following conditions. Molecular Weight Distribution of Polymer was evaluated by the ratio "Mw/Mn" of the weight average molecular weight (Mw) to the number average molecular weight (Mn)

[Detection Condition]
Solvent: o-dichlorobenzene (ODCB)+BHT0.1%
Temperature: 140° C. (SEC)
Column: GMHHR-H(20)×1 and GMHHR-H(S)HT2×1
Sample concentration: 0.5 mg/ml(ODCB)
Sample amount: 0.5 ml
Carrier solvent flow rate: 1.0 ml/min Example 2

Synthesis of Solid Catalyst Component (A2)

A solid catalyst component (A2) was prepared in the same manner as example 1, except that 0.6 ml (2.2 mmol) of di-n-butyl benzylidenemalonate was added to the flask instead of di-n-propyl phthalate at second step and third step.

The solid catalyst component (A2) had a titanium atom content of 1.8 mass %, a total phthalic diester content of 14.0 mass %, and di-n-butyl benzylidenemalonate content of 2.8 mass %.

Preparation of Propylene Polymerization Catalyst and Polymerization of Propylene A polymerization catalyst (B2) was prepared and evaluated in the same manner as example 1, except that the solid catalyst component (A2) was used instead of the solid catalyst (A1). The polymerization results are shown in Table 1.

Example 3

Synthesis of Solid Catalyst Component (A3)

A solid catalyst component (A3) was prepared in the same manner as example 1, except that 0.5 ml (2.2 mmol) of diethyl benzylidenemalonate was added to the flask instead of di-n-propyl phthalate at second step and third step.

The solid catalyst component (A3) had a titanium atom content of 1.7 mass %, a total phthalic diester content of 18.5 mass %, and diethyl benzylidenemalonate content of 8.0 mass %.

Preparation of Propylene Polymerization Catalyst and Polymerization of Propylene A polymerization catalyst (B3) was prepared and evaluated in the same manner as example 1, except that the solid catalyst component (A3) was used instead of the solid catalyst (A1). The polymerization results are shown in Table 1.

Example 4

Synthesis of Solid Catalyst Component (A4)

A solid catalyst component (A4) was prepared in the same manner as example 1, except that 4.4 ml (17.2 mmol) of di-n-propyl benzylidenemalonate was added stepwise to the mixture while heating the mixture instead of di-n-ethyl benzylidenemalonate at first step of heating procedure.

The solid catalyst component (A4) had a titanium atom content of 1.7 mass %, a total phthalic diester content of 15.3 mass %, and di-n-propyl benzylidenemalonate content of 2.2 mass %.

Preparation of Propylene Polymerization Catalyst and Polymerization of Propylene A polymerization catalyst (B4) was prepared and evaluated in the same manner as example 1, except that the solid catalyst component (A4) was used instead of the solid catalyst (A1). The polymerization results are shown in Table 1.

Example 5

Synthesis of Solid Catalyst Component (A5)

(1) First Step

A 75 liter round bottom reactor equipped with a stirrer in which the internal atmosphere had been sufficiently replaced by nitrogen gas, was charged with 6.6 l (60 mol) of titanium tetrachloride and 13.2 l (12.4 mol) of toluene to prepare a solution.

A suspension prepared using 3.3 kg (28.9 mol) of spherical diethoxymagnesium (diameter=43 μm), 13.2 l (12.4 mol) of toluene, and 660 ml (2.9 mol) of di-n-propyl phthalate was added to the solution. The mixture was stirred at −5° C. for 1 hour, and heated to 110° C. 660 ml (2.9 mol) of diethyl benzylidenemalonate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 30.9 l of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 28.1 l of toluene and 5.0 l (46 mol) of titanium tetrachloride were added to the reaction product slurry including the solid component (I). The mixture was heated to 110° C., and reacted for 2 hours with stirring. After completion of the reaction, the supernatant liquid was removed. After the addition of 29.7 l of toluene and 3.3 l (30 mol) of titanium tetrachloride, the mixture was heated to 80° C. After the addition of 83 ml (365 mmol) of di-n-propyl phthalate, the mixture was heated to 110° C., and reacted for 1 hour with stirring. The resulting reaction mixture was allowed to stand, and the supernatant liquid was removed to obtain reaction product slurry.

After completion of the reaction, 30.9 l of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step 30.9 l (290 mol) of toluene was added to the reaction product slurry including the solid component (II) to adjust the concentration of titanium tetrachloride in the reaction mixture to 0.2 mass %, and the mixture was heated to 80° C. After the addition of 83 ml (365 mmol) of di-n-propyl phthalate, the mixture was reacted at 100° C. for 1 hour with stirring. The resulting reaction mixture was allowed to stand, and the supernatant liquid was removed to obtain reaction product slurry.

After the addition of 24.9 l of n-heptane (60° C.) to the reaction product slurry, the mixture was stirred and allowed to stand, and the supernatant liquid was removed. This operation was repeated 7 times to wash the reaction product to obtain a solid catalyst component (A5) for olefin polymerization.

The solid catalyst component (A5) had a titanium atom content of 1.5 mass %, a total phthalic diester content of 14.5 mass %, and diethyl benzylidenemalonate content of 2.2 mass %.

Preparation of Propylene Polymerization Catalyst and Polymerization of Propylene A polymerization catalyst (B5) was prepared and evaluated in the same manner as example 1, except that the solid catalyst component (A5) was used instead of the solid catalyst (A1). The polymerization results are shown in Table 1.

Preparation of Ethylene-Propylene Copolymerization Catalyst and Production of Impact Copolymer An autoclave (internal volume: 2.0 l) equipped with a stirrer in which the internal atmosphere had been completely replaced by nitrogen gas, was charged with 2.2 mmol of triethylaluminum, 0.22 mmol of diethylaminotriethoxysilane, and the solid catalyst component (A1) (0.37 μmol on a titanium atom basis) to prepare an ethylene-propylene copolymerization catalyst.

An autoclave equipped with a stirrer was charged with the ethylene-propylene copolymerization catalyst, and further charged with liquefied propylene (15 mol) and hydrogen gas (partial pressure: 0.20 MPa). The liquefied propylene was subjected to preliminary polymerization at 20° C. for 5 minutes, and subjected to first-step homopropylene polymerization (homopolymerization) at 70° C. for 60 minutes. The pressure inside the autoclave was then returned to normal pressure.

Before starting copolymerization step, 0.70 MPa of propylene, 0.49 MPa of ethylene, and 0.010 MPa of hydrogen were added to the autoclave. The mixture was heated to 70° C., and reacted at 70° C. for 15 minutes under a pressure of 1.2 MPa while feeding ethylene, propylene, and hydrogen in a ratio of 1.6/2.4/0.015 (l/min) to obtain an ethylene-propylene copolymer. The polymerization results are shown in Table 2.

The propylene-based block copolymerization activity (ICP (impact copolymer) activity) (g-ICP/(g-cat)) was measured as described below to evaluate the sustainability of polymerization activity. The MFR of the homopolymer, the MFR of the ICP, the EPR content (rubber content) (wt %) in the propylene-based block copolymer, the ethylene content (wt %) in the EPR, the ethylene content (wt %) in the xylene-insoluble component, the flexural modulus (FM) (MPa), and the Izod impact strength (KJ/m$^2$) were also measured. The results are shown in Table 2.

ICP Polymerization Activity

The propylene-based block copolymerization activity per gram of the solid catalyst component was calculated by the following expression.

Propylene-based block copolymerization activity (g-ICP/g-catalyst)=(I(g)−F(g)+J(g))/[{mass(g) of solid catalyst component in olefin polymerization catalyst×((G(g)−F(g)−J(g))}/(G(g)−F(g)))]

Note that I is the mass (g) of the autoclave after completion of copolymerization, F is the mass (g) of the autoclave, G is the mass (g) of the autoclave after unreacted monomers had been removed after completion of PP homopolymerization, and J is the amount (g) of polymer removed after homopolymerization.

Homopolymerization Activity

The homopolymerization activity per gram of solid catalyst component was calculated by the following expression.
homopolymerization activity(g-PP/g-catalyst)=(G(g)−F(g)/(mass(g) of solid catalyst component in olefin polymerization catalyst).

EPR Content (Xylene-Soluble Content in ICP Polymer)

A flask equipped with a stirrer was charged with 5.0 g of the copolymer (ICP propylene polymer) and 250 ml of p-xylene. The external temperature was increased to be equal to or higher than the boiling point of xylene (about 150° C.), and the polymer was dissolved over 2 hours while maintaining p-xylene contained in the flask at the boiling point (137 to 138° C.). The solution was cooled to 23° C. over 1 hour, and an insoluble component and a soluble component were separated by filtration. A solution of the soluble component was collected, and p-xylene was evaporated by heating (drying) under reduced pressure. The weight of the residue was calculated, and the relative ratio (mass %) relative to the polymer (propylene-based block copolymer) was calculated to determine the EPR content.

Determination of Ethylene Content in EPR

A small amount of EPR (xylene-soluble component) that was extracted with xylene when determining the EPR content (xylene-soluble content in the ICP polymer) was sampled, and hot-pressed in the shape of a film. The ethylene content in the EPR was calculated from the absorbance measured using a Fourier transform infrared spectrometer (FT-IR) ("Avatar" manufactured by Thermo Nicolet) based on a calibration curve drawn using a plurality of samples having a known ethylene content.

Measurement wavelength: 720 cm·1 and 1150 cm·1

Film thickness: 0.1 to 0.2 mm

Ethylene Content in Xylene-Insoluble (XI) Component

A small amount of the xylene-insoluble component obtained by extraction with xylene was sampled, and hot-pressed in the shape of a film, and the ethylene content in the xylene-insoluble component was calculated in the same manner as the ethylene content in the EPR.

Melt Flow Rate (MFR) of Polymer

The melt flow rate (MFR) (melt flow index) (g/10 min) of homopolypropylene and the ICP polymer was measured in accordance with ASTM 01238 (JIS K 7210).

The Intrinsic Viscosity of EPR (I.V.-EPR)

The intrinsic viscosity of EPR (I.V.-EPR) was calculated by using following formula (Huggins equation) from the reduced viscosity (ηSP/c) measured in decalin at 135° C. by means of Ubbelohde-type viscometer;

$$\eta SP/c = [\eta] + K[\eta]^2 c$$

wherein, ηSP/c (dl/g) is reduced viscosity, [η] (dl/g) is intrinsic viscosity, c(g/dl) is polymer concentration, and K is 0.35 (Huggins constant).

Flexural Modulus (FM) of Polymer

The polymer was molded to prepare a property measurement specimen in accordance with JIS K 7171. The specimen was conditioned in a temperature-controlled room maintained at 23° C. for 144 hours or more, and the flexural modulus (FM) (MPa) was measured using the specimen provided that a liquid/powder exudate was not observed on the surface thereof. Note that the property measurement specimen was prepared as described below. 0.10 wt % of IRGANOX 1010 (manufactured by BASF), and 0.10 wt % of IRGAFOS 168 (manufactured by BASF) were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare the property measurement specimen.

Izod Impact Strength 0.10 wt % of IRGANOX 1010 (manufactured by BASF), and 0.10 wt % of IRGAFOS 168 (manufactured by BASF) were added to the ethylene-propylene copolymer, and the mixture was kneaded and granulated using a single-screw extruder to obtain pellets of the ethylene-propylene copolymer. The pellets of the ethylene-propylene copolymer were introduced into an injection molding machine (mold temperature: 60° C., cylinder temperature: 230° C.), and injection-molded to prepare a property measurement specimen. The specimen was conditioned in a temperature-controlled room maintained at 23° C. for 144 hours or more, and the Izod impact strength of the specimen was measured in accordance with JIS K 7110 ("Method of Izod Impact Test For Rigid Plastics") using an Izod tester ("Model A-121804405" manufactured by Toyo Seiki Seisaku-Sho, Ltd.).

Shape of specimen: ISO 180/4A, thickness: 3.2 mm, width: 12.7 mm, length: 63.5 mm Shape of notch: type-A notch (radius: 0.25 mm) formed using a die provided with a notch Temperature: 23° C. and −30° C.

Impact speed: 3.5 m/s

Nominal pendulum energy: 0.5 J (23° C.) and 0.5 J (−30° C.).

Example 6

Preparation of Propylene Polymerization Catalyst and Polymerization of Propylene A polymerization catalyst (B6) was prepared and evaluated in the same manner as example 5, except that 0.22 mmol of diisopropyldimethoxysilane was used instead of 0.22 mmol of diethylaminotriethoxysilane and 7.0 l of hydrogen was added instead of 5.5 l of hydrogen. The polymerization results are shown in Table 1.

Example 7

Preparation of Propylene Polymerization Catalyst and Poylmerization of Propylene A polymerization catalyst (B5) was prepared and evaluated in the same manner as example 5, except that polymerization was performed under 65° C. instead of 70° C. and 9.0 l of hydrogen was added instead of 5.5 l of hydrogen. The polymerization results are shown in Table 1.

Example 8

Evaluation of Flexural Modulus (FM)

With the same polymer obtained in the example 7, flexural modulus evaluation was performed in the same manner as example 1, except that 1,000 ppm of sodium benzoate was added as a nucleating agent instead of 800 ppm of Calcium Stearate before the extrusion process of the polymer. The results are shown in Table 1.

Comparative Example 1

Synthesis of Solid Catalyst Component (a1)
(1) First Step

A 500 ml round bottom flask equipped with a stirrer in which the internal atmosphere had been sufficiently replaced by nitrogen gas, was charged with 40 ml (364 mmol) of titanium tetrachloride and 60 ml (565 mmol) of toluene to prepare a solution.

A suspension prepared using 20 g (175 mmol) of spherical diethoxymagnesium (diameter=43 μm), 80 ml (753 mmol) of toluene, and 4.0 ml (17.3 mmol) of di-n-propyl phthalate was added to the solution. The mixture was stirred at −5° C. for 1 hour, and heated to 110° C. 4.0 ml (17.2 mmol) of di-n-propyl phthalate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 187 ml of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 170 ml of toluene and 30 ml (273 mmol) of titanium tetrachloride were added to the reaction product slurry including the solid component (I). The mixture was heated to 110° C., and reacted for 2 hours with stirring. After completion of the reaction, the supernatant liquid was removed. After the addition of 180 ml of toluene and 20 ml (182 mmol) of titanium tetrachloride, the mixture was heated to 80° C. After the addition of 0.5 ml (2.2 mmol) of diethyl benzylidenemalonate, the mixture was heated to 110° C., and reacted for 2 hours with stirring. The resulting reaction mixture was allowed to stand, and the supernatant liquid was removed to obtain reaction product slurry.

After completion of the reaction, 187 ml of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step 170 ml (1600 mmol) of toluene was added to the reaction product slurry including the solid component (II) to adjust the concentration of titanium tetrachloride in the reaction mixture to 0.2 mass %, and the mixture was heated to 80° C. After the addition of 0.5 ml (2.2 mmol) of diethyl benzylidenemalonate, the mixture was reacted at 100° C. for 1 hour with stirring. The resulting reaction mixture was allowed to stand, and the supernatant liquid was removed to obtain reaction product slurry.

After the addition of 150 ml of n-heptane (60° C.) to the reaction product slurry, the mixture was stirred and allowed to stand, and the supernatant liquid was removed. This operation was repeated 7 times to wash the reaction product to obtain a solid catalyst component (a1) for olefin polymerization.

The solid catalyst component (a1) had a titanium atom content of 1.7 mass %, a total phthalic diester content of 15.4 mass %, and diethyl benzylidenemalonate content of 4.0 mass %.

Preparation of Propylene Polymerization Catalyst and Polymerization of Propylene A polymerization catalyst (b1) was prepared and evaluated in the same manner as example 1, except that the solid catalyst component (a1) was used instead of the solid catalyst (A1). The polymerization results are shown in Table 1.

Comparative Example 2

Synthesis of Solid Catalyst Component (a2)

A 500 ml round bottom flask equipped with a stirrer in which the internal atmosphere had been sufficiently replaced by nitrogen gas, was charged with 20 g of diethoxymagnesium (diameter=43 μm), 110 ml of toluene, 40 ml of titanium tetrachloride. The mixture was heated to 60° C. After the addition of 8.2 ml (30.6 mmol) of diethyl diisopropylsuccinate, the mixture was heated to 100° C., and reacted for 2 hours with stirring. The resulting reaction mixture was allowed to stand, and the supernatant liquid was removed to obtain reaction product slurry.

After completion of the reaction, 90 ml of toluene (100° C.) was added to the reaction product slurry, the mixture was stirred and allowed to stand, and the supernatant liquid was removed. This operation was repeated 6 times to wash the reaction product to obtain reaction product slurry including a solid component.

100 ml of toluene and 20 ml of titanium tetrachloride were added to the reaction product slurry including the solid component. The mixture was heated to 100° C., and reacted for 15 minutes with stirring. After completion of the reaction, the supernatant liquid was removed. This operation was repeated 3 times followed by the addition of 150 ml of n-heptane (40° C.) to the reaction product slurry, the mixture was stirred and allowed to stand, and the supernatant liquid was removed. This operation was repeated 6 times to wash the reaction product to obtain a solid catalyst component (a2) for olefin polymerization.

The solid catalyst component (a2) had a titanium atom content of 2.2 mass %, and a diethyl diisopropylsuccinate content of 21.3 mass %.

Preparation of Propylene Polymerization Catalyst and Polymerization of Propylene A polymerization catalyst (b2) was prepared and evaluated in the same manner as example 1, except that the solid catalyst component (a2) was used instead of the solid catalyst (A1). The polymerization results are shown in Table 1.

Comparative Example 3

Synthesis of Solid Catalyst Component (a3)

(1) First Step

A 75 liter round bottom reactor equipped with a stirrer in which the internal atmosphere had been sufficiently replaced by nitrogen gas, was charged with 6.6 l (60 mol) of titanium tetrachloride and 13.2 l (12.4 mol) of toluene to prepare a solution.

A suspension prepared using 3.3 kg (28.9 mol) of spherical diethoxymagnesium (diameter=61 μm), 13.2 l (12.4 mol) of toluene, and 930 ml (4 mol) of di-n-propyl phthalate was added to the solution. The mixture was stirred at −5° C. for 1 hour, and heated to 110° C. 138 ml (480 mmol) of dimethyl di-isobutylmalonate was added stepwise to the mixture while heating the mixture. After reacting the mixture at 110° C. for 3 hours with stirring, the reaction mixture was allowed to stand, and the supernatant liquid was removed to obtain reaction product slurry.

After the addition of 30.9 l of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 28.1 l of toluene and 5.0 l (46 mol) of titanium tetrachloride were added to the reaction product slurry including the solid component (I). The mixture was heated to 110° C., and reacted for 2 hours with stirring. After completion of the reaction, the supernatant liquid was removed. After the addition of 29.7 l of toluene and 3.3 l (30 mol) of titanium tetrachloride, the mixture was heated to 80° C. After the addition of 83 ml (365 mmol) of di-n-propyl phthalate, the mixture was heated to 110° C., and reacted for 1 hour with stirring. The resulting reaction mixture was allowed to stand, and the supernatant liquid was removed to obtain reaction product slurry.

After completion of the reaction, 30.9 l of toluene (100° C.) was added to the reaction product slurry, the mixture was stirred and allowed to stand, and the supernatant liquid was removed. This operation was repeated twice to wash the reaction product to obtain reaction product slurry including a solid component (II).

(3) Third Step 30.9 l (290 mol) of toluene was added to the reaction product slurry including the solid component (II) to adjust the concentration of titanium tetrachloride in the reaction mixture to 0.2 mass %, and the mixture was heated to 80° C. After the addition of 83 ml (365 mmol) of di-n-propyl phthalate, the mixture was reacted at 100° C. for 1 hour with stirring. The resulting reaction mixture was allowed to stand, and the supernatant liquid was removed to obtain reaction product slurry.

After the addition of 24.9 l of n-heptane (60° C.) to the reaction product slurry, the mixture was stirred and allowed to stand, and the supernatant liquid was removed. This operation was repeated 7 times to wash the reaction product to obtain a solid catalyst component (a3) for olefin polymerization.

The solid catalyst component (a3) had a titanium atom content of 1.9 mass %, a total phthalic diester content of 18.7 mass %, and dimethyl di-isobutylmalonate content of 1.2 mass %.

Preparation of Propylene Polymerization Catalyst and Polymerization of Propylene A polymerization catalyst (b3) was prepared and evaluated in the same manner as example 1, except that the solid catalyst component (a3) was used instead of the solid catalyst (A1). The polymerization results are shown in Table 1.

Comparative Example 4

Synthesis of Solid Catalyst Component (a4)

(1) First Step

A 75 liter round bottom reactor equipped with a stirrer in which the internal atmosphere had been sufficiently replaced by nitrogen gas, was charged with 6.6 l (60 mol) of titanium tetrachloride and 13.2 l (12.4 mol) of toluene to prepare a solution.

A suspension prepared using 3.3 kg (28.9 mol) of spherical diethoxymagnesium (diameter=43 μm), 13.2 l (12.4 mol) of toluene, and 660 ml (2.9 mol) of di-n-butylphthalate was added to the solution. The mixture was stirred at −5° C. for 1 hour, and heated to 110° C. 660 ml (2.9 mol) of di-n-butylphthalate was added stepwise to the mixture while heating the mixture. After reacting the mixture at 90° C. for 3 hours with stirring, the reaction mixture was allowed to stand, and the supernatant liquid was removed to obtain reaction product slurry.

After the addition of 30.9 l of toluene (100° C.) to the reaction product slurry, the mixture was stirred and allowed to stand, and the supernatant liquid was removed. This operation was repeated four times to wash the reaction product to obtain reaction product slurry including a solid component (I).

(2) Second Step 28.1 l of toluene and 5.0 l (46 mol) of titanium tetrachloride were added to the reaction product slurry including the solid component (I). The mixture was heated to 110° C., and reacted for 2 hours with stirring. After completion of the reaction, the supernatant liquid was removed.

After the addition of 24.9 l of n-heptane (60° C.) to the reaction product slurry, the mixture was stirred and allowed to stand, and the supernatant liquid was removed. This operation was repeated 7 times to wash the reaction product to obtain a solid catalyst component (a4) for olefin polymerization.

The solid catalyst component (a4) had a titanium atom content of 2.8 mass % and a total phthalic diester content of 17.3 mass %.

Preparation of Propylene Polymerization Catalyst and Polymerization of Propylene A polymerization catalyst (b4) was prepared and evaluated in the same manner as example 1, except that the solid catalyst component (a4) was used instead of the solid catalyst (A1). The polymerization results are shown in Table 1.

Preparation of Ethylene-Propylene Copolymerization Catalyst and Production of Impact Copolymer A polymerization catalyst (b4) was prepared and evaluated in the same manner as example 1, except that the solid catalyst component (a4) was used instead of the solid catalyst (A1). The polymerization results are shown in Table 2.

TABLE 1 homo polymerization of propylene

| Example | Activity g-PP/g-cat | MFR g/10 min | XS % | FM MPa | Mn | Mw | Mz | Mw/Mn | Mz/Mw | Mz/Mn |
|---|---|---|---|---|---|---|---|---|---|---|
| 1 | 24,900 | 150 | 1.1 | 1,910 | 19,869 | 178,281 | 1,830,807 | 9.0 | 10.3 | 92.1 |
| 2 | 17,200 | 130 | 1.0 | 1,930 | 22,668 | 205,371 | 2,515,820 | 9.1 | 12.3 | 111.0 |
| 3 | 16,100 | 160 | 0.9 | 1,920 | 20,361 | 205,377 | 2,623,564 | 10.1 | 12.8 | 128.9 |
| 4 | 20,500 | 150 | 1.1 | 1,930 | 17,036 | 145,993 | 1,255,413 | 8.6 | 8.6 | 73.7 |
| 5 | 23,700 | 88 | 0.7 | 1,940 | 25,084 | 237,064 | 2,968,164 | 9.5 | 12.5 | 118.3 |
| 6 | 28,100 | 33 | 0.7 | 1,930 | 22,369 | 297,974 | 3,070,934 | 13.3 | 10.3 | 137.3 |
| 7 | 19,400 | 260 | 1.0 | 2,020 | 14,793 | 178,210 | 2,436,394 | 12.0 | 13.7 | 164.7 |
| 8 | | | | 2,470 | | | | | | |

TABLE 2 homo polymerization of propylene

| Comparative Example | Activity g-PP/g-cat | MFR g/10 min | XS % | FM MPa | Mn | Mw | Mz | Mw/Mn | Mz/Mw | Mz/Mn |
|---|---|---|---|---|---|---|---|---|---|---|
| 1 | 18,500 | 170 | 1.0 | 1,880 | 22,143 | 193,724 | 1,765,352 | 8.7 | 9.1 | 79.7 |
| 2 | 14,800 | 31 | 1.2 | 1,840 | 20,673 | 374,306 | 4,085,509 | 18.1 | 10.9 | 197.6 |
| 3 | 15,300 | 180 | 1.1 | 1,900 | 23,231 | 168,634 | 1,899,428 | 7.3 | 11.3 | 81.8 |
| 4 | 39,000 | 110 | 1.2 | 1,830 | 21,414 | 193,465 | 2,201,669 | 9.0 | 11.4 | 102.8 |

TABLE 3

ICP production

| | Activity | | | | | | | | Izod | |
|---|---|---|---|---|---|---|---|---|---|---|
| | Homo polymerization g-PP/g-catalyst. | ICP polymerization g-ICP/g-catalyst. | MFR g/10 min. | EPR content wt % | Ethylene content in EPR wt % | I.V. − inXI wt % | EPR dL/g | FM Mpa | (−30deg. C.) Kj/m² | (23deg. C.) Kj/m² |
| Example 9 | 35,300 | 1500 (15 min) | 170(Homo) 120(ICP) | 5.0 | 42.5 | 1.1 | 5.5 | 1660 | 2.4 | 4.4 |

TABLE 3-continued

| | ICP production | | | | | | | | |
|---|---|---|---|---|---|---|---|---|---|
| | Activity | | | EPR | Ethylene content | | I.V. – | | Izod |
| | Homo polymerization g-PP/g-catalyst. | ICP polymerization g-ICP/g-catalyst. | MFR g/10 min. | content wt % | in EPR wt % | inXI wt % | EPR dL/g | FM Mpa | (−30deg. C.) Kj/m² | (23deg. C.) Kj/m² |
| Comparative Example 5 | 43900 | 3000 (15 min) | 180(Homo) 110(ICP) | 5.6 | 40.3 | 1.6 | 5.6 | 1600 | 2.7 | 4.5 |

As is clear from the results shown in Table 1 and Table 3, the olefin polymerization catalysts respectively prepared using the solid catalyst components obtained in Examples 1 to 9 achieved producing homo polypropylene or propylene-based block copolymer with high isotacticity and broad molecular distribution. Therefore the flexural modulus of the resulting (co)polymer is improved.

On the other hand, as is clear from the results shown in Table 2 and Table 3, polypropylene or propylene-based block copolymer produced with the solid catalyst components obtained in comparative Examples 1 to 5 showed an insufficient flexural modulus compared to the results of Examples 1 to 9.

INDUSTRIAL APPLICABILITY

The embodiments of the invention thus provide a method for producing homo propylene that exhibits high stiffness and propylene-based block copolymer that exhibits rigidity and impact strength in a well-balanced manner.

What is claimed is:

1. A method for producing an olefin polymerization catalyst component, the method comprising:
bringing a magnesium compound, a tetravalent titanium halide compound, an organic compound represented the following general formula (1)

$$R^1_k(C_6H_{4-k})(COOR^2)(COOR^3) \quad (1)$$ and an organic compound represented the following general formula (2)

$$R^4R^5C=C(COOR^6)(COOR^7) \quad (2)$$

into contact with each other at the same step,
wherein $R^1$ is a halogen atom or an alkyl group having 1 to 8 carbon atoms, $R^2$ and $R^3$ are a linear alkyl group having 1 to 6 carbon atoms, provided that $R^2$ and $R^3$ are either identical or different, and k is an integer from 0 to 4, provided that a plurality of $R^1$ are either identical or different when k is an integer from 2 to 4, and
wherein $R^4$ and $R^5$ are independently an atom or group selected from a hydrogen atom, halogen, a linear alkyl group having 1 to 20 carbon atoms, a branched alkyl group having 3 to 20 carbon atoms, a vinyl group, a linear or branched alkenyl group having 3 to 20 atoms, a cycloalkenyl group having 3 to 20 carbon atoms, an aromatic hydrocarbon group having 6 to 20 carbon atoms, provided that $R^4$ and $R^5$ optionally bond to each other to form a ring, and the number of carbon atoms of $R^5$ is 2 or more when $R^4$ is a hydrogen atom or a methyl group; and
wherein $R^6$ and $R^7$ are independently a linear alkyl group having 1 to 20 carbon atoms, a branched alkyl group having 3 to 20 carbon atoms, a vinyl group, a linear or branched alkenyl group having 3 to 20 carbon atoms, a cycloalkyl group having 3 to 20 carbon atoms, a cycloalkenyl group having 3 to 20 carbon atoms, or an aromatic hydrocarbon group having 6 to 20 atoms.

2. A method for producing an olefin polymerization catalyst component according to the claim 1, the method comprising:
a first step that brings a magnesium compound and a tetravalent titanium halide compound into contact with each other to make a reaction, followed by removing the reaction medium and optionally washing;
a second step that brings a tetravalent titanium halide compound into contact with a product obtained by the first step to make a reaction, followed by removing the reaction medium and optionally washing;
wherein compounds selected respectively from an organic compound represented by the following general formula (1) and an organic compound represented by the following general formula (2) are further added in at least either the first step and the second step.

3. A method for producing an olefin polymerization catalyst component according to the claim 2, the method further comprising:
a third step that brings a an organic compound represented the following general formula (1) and an organic compound represented the following general formula (2) into contact with a product obtained by the second step to make a reaction, followed by removing the reaction medium and optionally washing.

4. An olefin polymerization catalyst includes (I) the solid catalyst component for olefin polymerization obtained by the method according to claim 1, (II) an organo aluminum compound represented by the following general formula (3), $$R^8_pAlQ_{3-p} \quad (3)$$ and (III) an external donor compound represented by the following general formula (4) or an external donor compound represented by the following general formula (5)

$$R^9_qSi(OR^{10})_{4-q} \quad (4)$$

$$(R^{11}R^{12}N)_sSiR^{13}_{4-s} \quad (5)$$

wherein $R^8$ is an alkyl group having 1 to 6 carbon atoms; Q is a hydrogen atom or halogen atom; and p is an integer from 0 to 3; and
wherein $R^9$ is an alkyl group having 1 to 12 carbon atoms, a cycloalkyl group having 3 to 12 carbon atoms, a phenyl group, a vinyl group, an allyl group, or an aralkyl group, provided that a plurality of $R^9$ are either identical or different when a plurality of $R^9$ are present; $R^{10}$ is an alkyl group having 1 to 4 carbon atoms, a cycloalkyl group having 3 to 6 carbon atoms, a phenyl group, a vinyl group, an allyl group, or an aralkyl group, provided that a plurality of $R^{10}$ are either identical or different when a plurality of $R^{10}$ are present; and q is an integer from 0 to 3;

$R^{11}$ and $R^{12}$ are a hydrogen atom, a linear alkyl group having 1 to 20 carbon atoms, a branched alkyl group having 3 to 20 carbon atoms, a vinyl group, an allyl group, or an aralkyl group, a cycloalkyl group having 3 to 20 carbon atoms, or aryl group, provided that $R^{11}$ and $R^{12}$ are either identical or different, and optionally bond to each other to form a ring;

$R^{13}$ is a a linear alkyl group having 1 to 20 carbon atoms, a branched alkyl group having 3 to 20 carbon atoms, a vinyl group, an allyl group, or an aralkyl group, a linear or branched alkoxy group having 1 to 20 carbon atoms, a vinyloxy group, an allyloxy group, a cycloalkyl group having 3 to 20 carbon atoms, an aryl group, or an aryloxy group, provided that a plurality of $R^{13}$ are either identical or different when a plurality of $R^{13}$ are present; and s is an integer from 0 to 3.

5. A process for propylene polymerization wherein propylene is contacted by a catalyst comprising the catalyst component according to claim 1, an organoaluminum compound, and an external electron donor compound.

\* \* \* \* \*